United States Patent
Matsui

(10) Patent No.: US 7,162,142 B2
(45) Date of Patent: Jan. 9, 2007

(54) DATA PLAYBACK APPARATUS, DATA PLAYBACK METHOD, STORAGE MEDIUM, AND DATA STRUCTURE

(75) Inventor: Yoshinori Matsui, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1244 days.

(21) Appl. No.: 09/887,342

(22) Filed: Jun. 25, 2001

(65) Prior Publication Data

US 2002/0006274 A1 Jan. 17, 2002

(30) Foreign Application Priority Data

Jun. 30, 2000 (JP) .............................. 2000-198291

(51) Int. Cl.
*H04N 5/91* (2006.01)
(52) U.S. Cl. ............................ 386/46; 386/98; 386/94; 386/109
(58) Field of Classification Search ................ 386/46, 386/94
See application file for complete search history.

(56) References Cited

U.S. PATENT DOCUMENTS

| | | | | |
|---|---|---|---|---|
| 5,627,655 | A | * | 5/1997 | Okamoto et al. .............. 386/94 |
| 6,034,832 | A | * | 3/2000 | Ichimura et al. .............. 360/60 |
| 6,710,816 | B1 | * | 3/2004 | Minami ....................... 348/554 |
| 7,050,118 | B1 | * | 5/2006 | Okada et al. ................ 348/731 |

* cited by examiner

*Primary Examiner*—Thai Q. Tran
*Assistant Examiner*—Helen Shibru
(74) *Attorney, Agent, or Firm*—Wenderoth, Lind & Ponack, L.L.P.

(57) ABSTRACT

The present invention provides a data playback apparatus which can judge whether or not digital data, which are composed of a first data part including attribute information, and a second data part which is subsequent to the first data part and in which compressively coded audio and video data are multiplexed, can be played back at a timing when the first data part has been received. An analysis means which receives the first data part in the digital data to be analyzed has a function of detecting a data structure element having a predefined value from the first data part, and stops a receiving operation of a receiving means when the data structure element is not detected.

15 Claims, 8 Drawing Sheets

DATA PLAYBACK APPARATUS, DATA PLAYBACK METHOD, STORAGE MEDIUM, AND DATA STRUCTURE

FIELD OF THE INVENTION

The present invention relates to a data playback apparatus, a data playback method, a storage medium, and a data structure, for accessing digital data which include audio and video data in a server on a network and playing back the data while receiving the same.

BACKGROUND OF THE INVENTION

In recent years, owing to developments in the technology for compressively coding audio or video, increases in the performance of personal computers (PC) and the spread of the Internet, the so-called streaming service has been generalized. In the streaming service, audio or video data on the network are accessed and played back while being received. In order to receive the streaming service, an apparatus or a software program for receiving and playing back the data is required. At the present time, it is mainstream that a data playing software is activated on a PC to receive and play back audio or video data.

As the compressive coding method, many methods are used at present, such as MPEG-1, MPEG-2 and MPEG-4, which are standardized by ISO/IEC, and H.261, H.263 and G.729, which are standardized by ITU-T. When playback software on a PC does not support the compressive coding method for audio or video data which are included in accessed data, the playback software can analyze decoding software information which is added to the accessed data, and download the decoding software on a network to automatically incorporate the decoding software into the playback software. Accordingly, the data according to various kinds of compressive coding methods can be decoded.

To determine a file format in a case where audio and video is to be multiplexed, the extension of the file (a character string normally composed of three alphanumeric characters situated after a "." (dot) behind the file name) is usually used. The PC can also handle the file format flexibly. For example, the same data playback software supports plural file formats, or data playback software programs are switched for each file format.

As described above, flexible structures having greater extensibility are possible on the PC.

Recently, portable terminals (portable telephones) have remarkably come into wide use. Further, the portable terminals are frequently provided with new functions. In the so-called "I-mode" services which were started in 1999, the connection of the portable terminals with the Internet become possible. It is also expected that digital data including audio and video on the Internet can be accessed from the portable telephones to receive and play back the data, in the near future.

However, it is difficult for the portable telephone to have a flexible and extensible structure like the playback software in the conventional PC. One reason is that the portable terminal is required to be compact to allow the user to carry it with him. Therefore, the portable terminal is forced to support only extremely limited compressive coding methods or file formats, and thus it is important to judge whether or not a compressively coded format or file format can be played back on the portable terminal side.

Even when extensions of file formats are the same, there could be some cases where the data can be played back by the PC, while the data cannot be played back by the portable telephone. This is due to restrictions on the hardware of the portable telephone or the software. Therefore, there are some cases where it cannot be simply judged only from the file format whether or not the playback can be performed.

Further, as in the case of I-mode, the portable terminal can also access data on common Internet servers. As an example of the methods for accessing the Internet servers, there is a capability switching method for previously judging whether or not data which are to be received can be decoded and played back by the portable terminal before starting to receive the data, and thereafter receiving the data only when the decoding and playback of the data is possible. However, this capability switching method has not become widespread on the common Internet servers, and cannot be used generally. Thus, it cannot be put to practical use under the present circumstances in which portable terminal is controlled by using the capability switching method to receive the data only when the decoding and playback is possible.

Further, in the case of portable terminals, the communication charges are higher than those of the common Internet connection, and the communication charges are further added according to the quantity of received data, whereby data receiving should be stopped immediately when the data playback is impossible. However, the conventional portable terminal has no means for enabling this.

SUMMARY OF THE INVENTION

It is therefore an object of the present invention to provide a data playback apparatus, a data playback method, a storage medium and a data structure for enabling a prompt judgment as to whether or not the playback is possible without the capability switching.

Other objects and advantages of the present invention will become apparent from the detailed description. The specific embodiments described herein are provided only for illustration since various additions and modifications within the spirit and scope of the invention will be apparent to those skilled in the art from the detailed description.

According to a first aspect of the present invention, a data playback apparatus is provided which plays back digital data having a first data part which includes attribute information of the digital data, and a second data part which is subsequent to the first data part and in which compressively coded audio and video data are multiplexed, while receiving the digital data. The data playback apparatus comprises: a receiver for receiving the digital data; a buffer for containing the received digital data; an analyzer for receiving the first data part in the stored digital data and analyzing the first data part; a decoder for receiving the second data part in the stored digital data and decoding the compressively coded audio and video data together with separating the data; and a display for displaying the data decoded by the decoder. The analyzer has a function of detecting a data structure element having a predefined value from the first data part, and instructs the receiver to stop its operation when the data structure element is not detected. Therefore, it can be promptly judged whether or not the digital data can be played back or not, and when the playback is impossible, the data receiving can be immediately stopped.

According to a second aspect of the present invention, in accordance with the data playback apparatus of the first aspect, when the data structure element is not detected, the analyzer instructs the display to display a message which indicates that the digital data cannot be played back. Therefore, the data playback apparatus can inform the user that the playback is impossible.

According to a third aspect of the present invention, in accordance with the data playback apparatus of the first aspect, the analyzer compares a version number of digital data which are included in the data structure element (hereinafter referred to as a first version number) with a version number which is previously set in the data playback apparatus (hereinafter referred to as a second version number), and instructs the receiver to stop its operation when the first version number is larger than the second version number. Therefore, it can be promptly judged whether or not the digital data can be played back, and when the playback is impossible, the data receiving can be immediately stopped.

According to a fourth aspect of the present invention, in accordance with the data playback apparatus of the first aspect, the analyzer compares a version number of digital data which are included in the data structure element (hereinafter referred to as a first version number) with a version number which is previously set in the data playback apparatus (hereinafter referred to as a second version number), and instructs the display to display a message which indicates that the digital data cannot be played back when the first version number is larger than the second version number. Therefore, the data playback apparatus can inform the user that the playback is impossible.

According to a fifth aspect of the present invention, in accordance with the data playback apparatus of the first aspect, the analyzer compares a version number of digital data which are included in the data structure element (hereinafter referred to as a first version number) with a version number which is previously set in the data playback apparatus (hereinafter referred to as a second version number), and instructs the display to display inquire information which inquires a user of the data playback apparatus as to whether playback of the digital data is to be tried, when the first version number is larger than the second version number. Therefore, the inquire information as to whether or not the user desires a trial of the playback can be displayed.

According to a sixth aspect of the present invention, a data playback apparatus is provided which plays back digital data having a first data part which includes attribute information of the digital data, and a second data part which is subsequent to the first data part and in which compressively coded audio and video data are multiplexed, while receiving the digital data. The data playback apparatus comprises: a receiver for receiving the digital data; a buffer for containing the received digital data; an analyzer for receiving the first data part in the stored digital data and analyzing the first data part; a decoder for receiving the second data part in the stored digital data and decoding the compressively coded audio and video data together with separating the data; and a display for displaying the data decoded by the decoder. The analyzer detects a data structure element having a predefined value from the first data part, and changes an operation mode of one of the receiver, the buffer, the decoder and the display, in accordance with information indicated by the data structure element. Therefore, the intentions of the creator of the digital data can be reflected to the operation of the data playback apparatus.

According to a seventh aspect of the present invention, a data playback method is provided by which digital data having a first data part which includes attribute information of the digital data, and a second data part which is subsequent to the first data part and in which compressively coded audio and video data are multiplexed are played back while being received. The data playback method comprises: a first step of receiving the digital data; a second step of receiving the first data part in the received digital data and judging whether or not a data structure element having a predefined value is in the first data part; a third step of receiving the second data part in the received digital data and decoding the compressively coded audio and video data together with separating the data, only when the data structure element is detected in the second step; and a fourth step of displaying the decoded audio or video data. Therefore, it can be promptly judged whether or not the digital data can be played back, and when the playback is impossible, the data receiving can be immediately stopped.

According to an eighth aspect of the present invention, a storage medium is provided that contains a software program which makes a computer execute the data playback method of the seventh aspect. Therefore, when the program which is recorded in the storage medium is implemented, it can be promptly judged whether or not the digital data can be played back, and when the playback is impossible, the data receiving can be stopped immediately.

According to a ninth aspect of the present invention, in accordance with the data playback apparatus of the first aspect, the data structure element having the predefined value is positioned as a second data structure element in the first data part. Therefore, it can be judged more promptly as to whether or not the playback is possible.

According to a tenth aspect of the present invention, a data structure is provided which has: a first data part which includes attribute information of the data structure; and a second data part which is subsequent to the first data part and in which compressively coded audio and video data are multiplexed. The first data part includes playback suitability information which indicates to a data playback apparatus having restrictions on data playable targets under functional constraints that the data structure is suitable for playback by the data playback apparatus. Therefore, when the data playback apparatus having functional constraints receives this data structure, the data playback apparatus can judge that the data are created for itself, and can play back the data.

According to an eleventh aspect of the present invention, in accordance with the data structure of the tenth aspect, the first data part is composed of first to N-th (N is an integer which is equal to 2 or larger) data structure elements, and a second data structure element among the first to N-th data structure elements indicates the playback suitability information. Therefore, when the data playback apparatus having functional constraints receives this data structure, the data playback apparatus can judge more promptly that the data are created for itself, and can play back the data.

According to a twelfth aspect of the present invention, in accordance with the data structure of the eleventh aspect, the second data structure element is positioned at a head of the first data part or in the vicinity of the head. Therefore, when a special data playback apparatus receives this data structure, the data playback apparatus can judge immediately whether the data are created for itself.

According to a thirteenth aspect of the present invention, in accordance with the data structure of the twelfth aspect, the first to N-th data structure elements each have identification number information indicating one of the first to N-th data structure elements. Therefore, it can be judged easily whether the second data structure element is in the data structure elements.

According to a fourteenth aspect of the present invention, in accordance with the data structure of the eleventh aspect, the data structure element has version information indicating a version of a data structure which includes the data structure element. Therefore, this version information is compared with the version information of the data playback apparatus, whereby it can be judged whether or not the data structure including this data structure element can be played back by the data playback apparatus.

According to a fifteenth aspect of the present invention, in accordance with the data structure of the eleventh aspect, the data structure element has extended data indicating handling information which indicates various kinds of handling for the data structure. Therefore, the handling of this data structure can be judged by the data playback apparatus in accordance with the intentions of the creator of the data structure including this data structure element.

As described above, according to the present invention, the judgement as to whether or not the digital data including audio and video can be played back can be made immediately after the start of data receiving, and when the playback is impossible, the receiving of the data is stopped. Consequently, the communication charges can be suppressed when the playback is impossible at the data receiving.

DETAILED DESCRIPTION OF THE PREFERRED EMBODIMENTS

A data playback apparatus according to an embodiment of the present invention will be described with reference to FIGS. 1 to 4. The data playback apparatus according to this embodiment analyzes information added to part of digital data, which information indicates whether or not the data can be played back by a portable terminal, in the portable terminal, thereby promptly judging whether or not the playback is possible without the capability switching.

To be more specific, in a case where only previously decided digital data can be played back, the data playback apparatus detects a specific data structure which is included in the digital data. When this data structure is detected, the data playback apparatus judges that the data are created for portable terminals, and carries out the data playback in this case.

Figure 1:
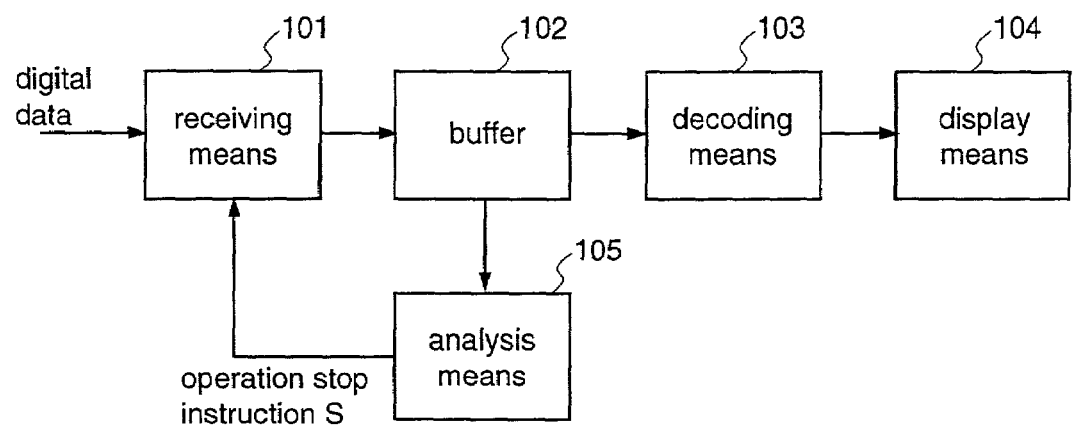
FIG. 1 is a block diagram illustrating a structure of a data playback apparatus according to an embodiment of the present invention.

FIG. 1 is a block diagram illustrating a structure of the data playback apparatus according to this embodiment of the present invention. This data playback apparatus comprises a receiving means 101, a buffer 102, a decoding means 103, a display means 104, and an analysis means 105.

Next, the operation of the data playback apparatus is described. The receiving means 101 receives digital data which are recorded in a data server on a network, and stores the received digital data in the buffer 102. The HTTP (Hyper Text Transfer Protocol) is used as a data transfer protocol in receiving data. The HTTP is widely used in transmitting or receiving data on the Internet or Intranet, and this is a system having a higher versatility. When a GET method of the HTTP is transmitted by a transmission means (not shown) to a data server, digital data are transmitted from the data server. The data playback apparatus transmits this method to the data server, and receives digital data in response thereto. Next, the structure of the received digital data is described.

The digital data which are recorded in the data server have a data structure 2 as shown in FIG. 2(a), which is composed of a first data part 201 corresponding to a header, a second data part 202 corresponding to data body, and a third data part 203 which includes information enabling the random access.

The first data part 201, as shown in FIG. 2(b), is composed of plural data structure elements 2011, 2012, 2013, . . . . An example of the data structure elements is shown in FIG. 3. FIG. 3(a) shows contents of the second data structure element 2012 in FIG. 2(b). The second data structure element 2012 is, as shown FIG. 3(a), composed of an identification number 301, a data size (structure element size) 302, and data 303. The identification number 301 is a numerical value for identifying this data structure element as the second data structure element 2012. The numerical value varies with types of the data structure elements. The bit length of the identification number 301 is, for example, 128 bits. The data size 302 shows the size of the second data structure element 2012 with a byte size. The data size 302 is not limited to this, and can show the size of the data 303 of the second data structure element 2012 with a byte size. The bit length of the data size 302 can be, for example, 32 bits. However, the bit length can also be either a 16-bit length or 64-bit length.

The size of the data 303 is obtained by subtracting 128 bits, which is the bit length of the identification number 301, from the value indicated by the data size 302. For example, when the value indicated by the data size 302 is "1000", the size of the data 303 is 1000−128/8=984 bytes. The internal structure of the data 303 varies with the identification number of the data structure element. When the identification number of the data structure element is an identification number which indicates the second data structure element 2012, the data 303 has an internal structure as shown in FIG. 3(b), which is composed of a version number 3031, an extended data size 3032, and extended data 3033. The version number 3031 shows the version number of the digital data 2. The corresponding version number of the data playback apparatus itself is also previously stored, for example, in a ROM in the data playback apparatus. The extended data size 3032 shows the size of the extended data 3033. The extended data 3033 can contain information for defining the operation of the data playback apparatus and the like.

The extended data 3033, as shown in FIG. 3(c), is composed of a redistribution permission flag 30331, a special playback permission flag 30332, a 4-bit field 30333, and a reserved field 30334. The redistribution permission flag 30331 is a 1-bit flag which indicates whether or not the data 2 having the data structure element including this expanded data can be redistributed without consent of the copyright holder. The special playback permission flag 30332 is a 1-bit flag which indicates whether or not special playback, such as pause, slow playback, high-speed playback, and jump playback, of the data 2 having the data structure element including this extended data is permitted. The 4-bit field 30333 shows the level of contents of the data 2 which have the data structure element including this extended data, the playback of which contents is regulated, such as violence scenes. The reserved field 30334 is a 26-bit field which is previously reserved for feature expansion in the future.

As other examples of the extended data, the extended data may contain a number-of-playback field for specifying the number of times that the data 2 can be played back, a display image size specification field for specifying the size of a display image which is to be displayed on the display means 104, and a thumbnail storage field for containing a thumbnail image (JPEG) which is a typical image of data to be played back and displayed in the second data part.

The second data structure element is constructed as described above.

In the second data part 202 of the digital data 2, as shown in FIG. 2(c), compressively coded video or audio data 2021, 2022, 2023, 2024, 2025, . . . are interleaved in packet units. Here, the packets to be interleaved are not restricted to video and audio, and can be packets including still-picture data, text data and the like.

Figure 4:
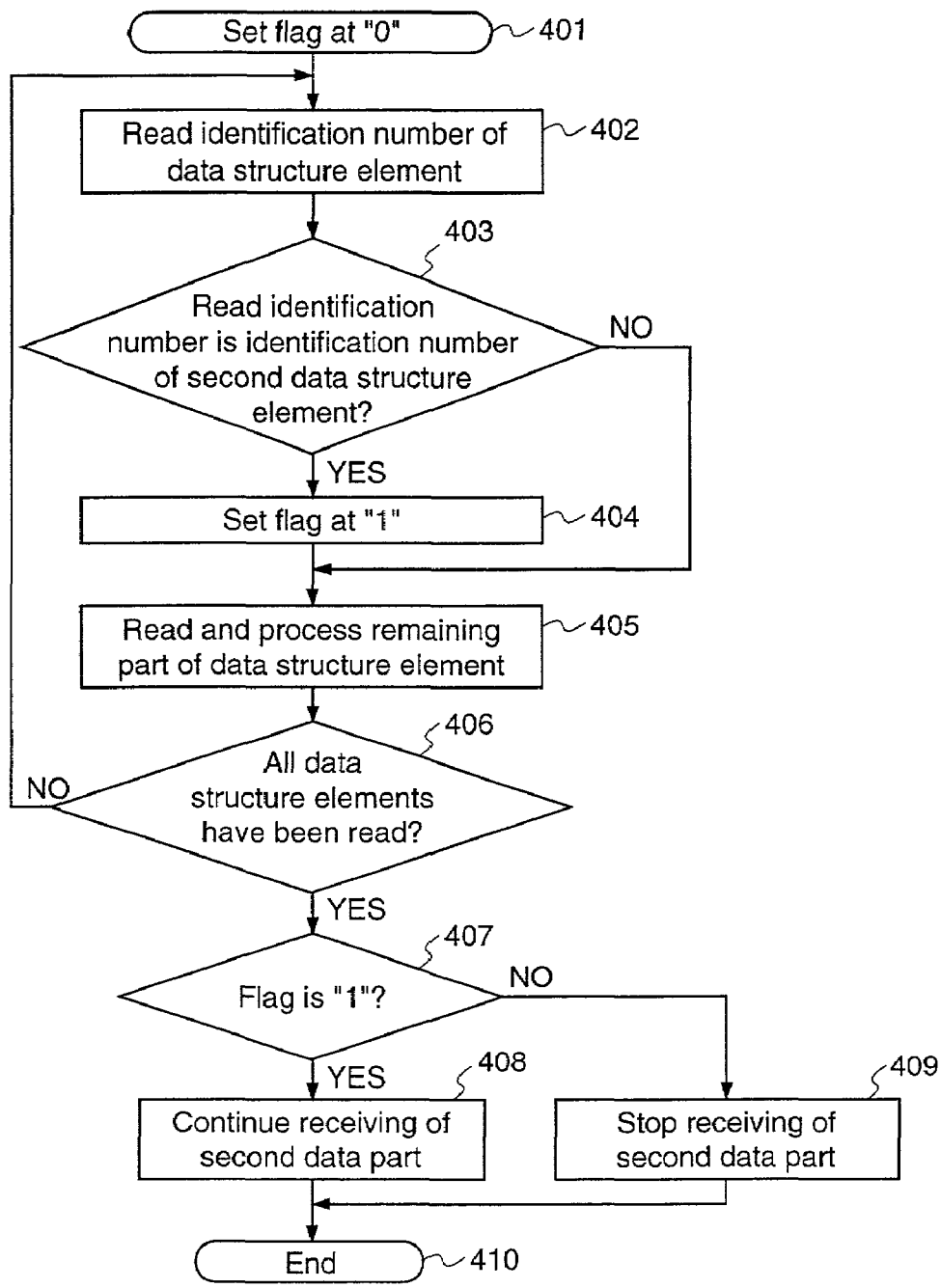
FIG. 4 is a flowchart for explaining part of an operation of an analysis means of the data playback apparatus according to the embodiment of the present invention.

The first data part 201 in the digital data 2 which are stored in the buffer 102 is transmitted to the analysis means 105. The analysis mean-s 105 analyzes the respective data structure elements 2011, 2012, 2013, . . . which are included in the first data part 201. FIG. 4 is a flowchart for explaining the operation of the analysis means 105, with attention being focused on the processing for the second data structure element.

In step 401, the flag is set at "0". This flag is used for judging whether or not the second data structure element 2012 is in the first data part 201. In step 402, the identification number of the data structure element is read. In step 403, it is judged whether or not the read identification number matches the identification number of the second data structure element 2012. The flag is set at "1" in step 404 only when these identification numbers match. Then, in step 405, the remaining part of the data structure element is read and processed. The remaining part of the data structure element can be read by using the value indicated by the data size 302, as shown in FIG. 3(a). Then, in step 406, it is judged whether or not all data structure elements in the first data part 201 have been processed. When there are data structure elements left to be processed, the operation returns to step 402 and the processes of step 403 and thereafter are repeatedly carried out. On the other hand, when the processes for all the data structure elements are completed, the flag is judged in step 407. When the flag is set at "1", the receiving of the second data part 202 is successively carried out (step 408). On the other hand, when the flag is set at "0", the receiving of the second data part 202 is stopped (step 409). As an example of the methods for stopping the data receiving, a method for cutting the connection between the data playback apparatus and the data server or the like can be used.

When step 408 is performed, the decoding means 103 of the data playback apparatus in FIG. 1 reads the second data part 202 from the buffer 102, and carries out the decoding process together with separating the packets including the compressively coded audio and video data. Then, the display means 104 displays and plays back the decoded audio and video data.

According to this embodiment of the present invention, when the previously decided data structure element is in the first data part of the received digital data, the data are judged to be created for the portable terminals, and the data are decoded and played back. When this structure element is not detected, it is judged that the data are created for the PC and normal decoding and playback of the data cannot be carried out by the portable terminals, and then the receiving is stopped.

In the data playback apparatus according to this embodiment of the present invention, the data playback apparatus is realized by hardware, while when a software program performing the same operation is implemented by a CPU, the same effects can be obtained.

Figure 5:
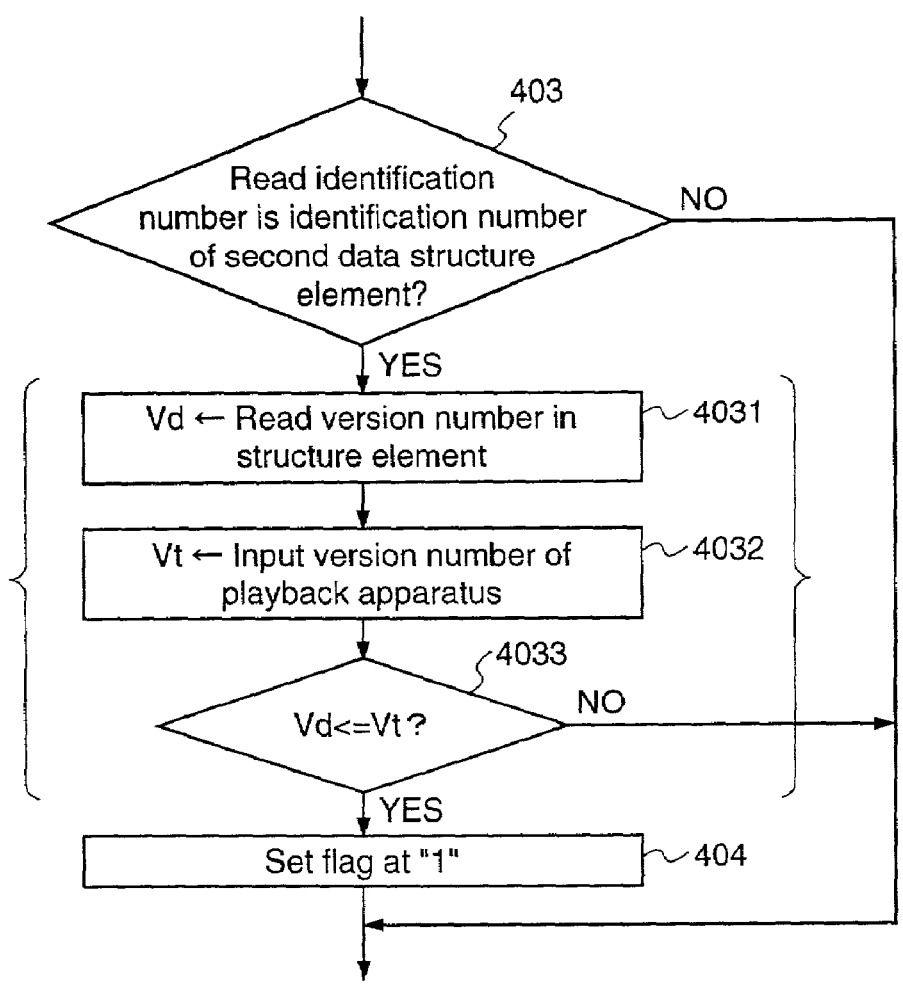
FIG. 5 is a flowchart for explaining part of the operation of the analysis means of the data playback apparatus according to the embodiment of the present invention.

Further, in the data playback apparatus according to this embodiment of the present invention, the data playback is always performed when there is the previously decided data structure element. However, it is also possible to judge on the basis of the version number 3031 in the second data structure element in FIG. 3(b) or contents of the extended data 3033 as to whether the playback is possible, and decide whether the receiving is to be continued or stopped. For example, the analysis means 105 compares the value (A) of the version number which is stored in the data playback apparatus, with the value (B) of the version number of the data structure element, and carries out the data decoding and playback only when the value (B) is equal to or smaller than the value (A). In other cases, it is judged that the decoding and playback of the digital data is impossible, and the receiving is stopped. In this case, as shown in FIG. 5, processes of steps 4031 to 4033 are provided between steps 403 and 404. Then, it is judged whether or not the read identification number matches the identification number of the second data structure element 2012 in step 403, and the processes of steps 4031 to 4033 are carried out only when the identification numbers match.

In step 4031, the version number in the data structure element is read and assigned to a variable Vd. In step 4032, the version number of the data playback apparatus itself is input and assigned to a variable Vt. In step 4033, when the variable Vt is equal to or larger than the variable Vd, i.e., the version number of the data playback apparatus itself is equal to or larger than the version number in the structure element, the operation proceeds to step 404, and step 404 is otherwise skipped.

The reason is as follows. When the version number which is stored in the data playback apparatus is not equal to or larger than the version number in the data structure element, there is a possibility that the apparatus does not support formats of the data structure elements subsequent to the second data structure element, the second data part, and the third data part. Further, there are some cases where the screen size of the display device of the data playback apparatus is not sufficient to display data including the data structure element. In these cases, the analysis means 105 issues an operation stop instruction S to the receiving means 101, thereby stopping the receiving.

The analysis means 105 refers to the special playback permission flag 30332 of the extended data, and the special playback in accordance with the user's operation is permitted only when the value of the special playback permission flag 30332 is "1". As the special playbacks, there are the pause which temporarily stops the display, the slow playback which reads received data at a later timing than usual to decode and display the data, the high-speed playback which reads received data at an earlier timing than usual to decode and display the data and the like.

When the analysis means 105 gives an instruction to at least one of the receiving means 101, the buffer 102, and the decoding means 103 and the display means 104 in accordance with the user's operation, to switch the operation mode, these special playbacks are realized.

Further, the analysis means 105 refers to the redistribution permission flag 30331 of the extended data, and the redistribution in accordance with the user's operation is performed only when the value of the redistribution permission flag 30331 is "1". When the redistribution is to be performed, the analysis means 105 gives an instruction to the buffer 102 and a transmission means (not shown), to transmit the received data which are stored in the buffer 102 to another portable terminal or PC having a receiving means through the transmission means in accordance with the user's operation.

When the redistribution is inhibited, the analysis means 105 gives an instruction to the buffer 102 and the transmission means not to transmit the received data which are stored in the buffer 102.

The 4-bit field 30333 can arbitrarily regulate the data 2 having contents which are not desirable to be viewed, on the portable terminal side. For example, in a case where the level of a violence scene which is indicated by the 4-bit field 30333 is equal to or lower than the level which is set on the portable terminal side, the 4-bit field 30333 permits the receiving of the data. When the analysis means 105 refers to the 4-bit field 30333 and the level is equal to or lower than the level which is set on the portable terminal side, the analysis means 105 gives an instruction to the decoding means 103 and the display means 104 to decode and display the data. On the other hand, when the level of the 4-bit field 30333 exceeds the level which is set by the portable terminal, the analysis means 105 gives an instruction to at least one of the decoding means 103 and the display means 104 not to perform at least one of the decoding and display of the data.

In addition, the thumbnails which are still-picture images indicating typical screens of the image data which are stored in the data 2 and the like can be stored in the reserved field 30334. In this case, the analysis means 10.5 refers to the reserved field 30334, and gives an instruction to the decoding means 103 to decode the thumbnail images (JPEG), thereby displaying the images on the display means 104.

Figure 9:
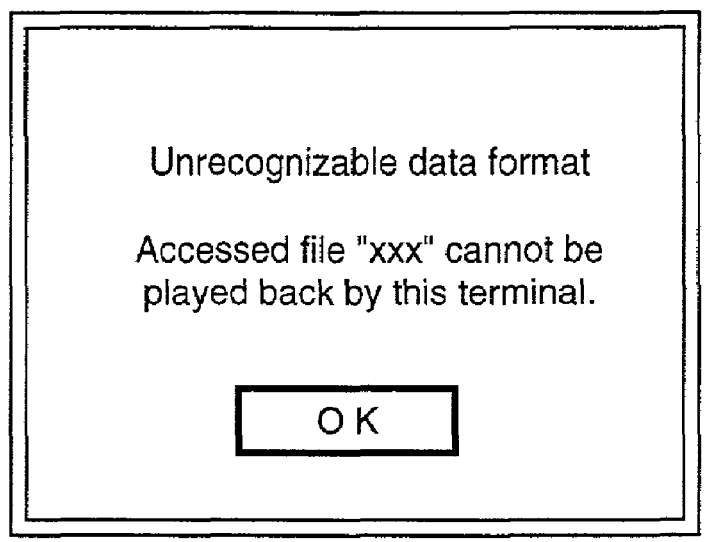
FIGS. 9(a) and 9(b) are diagrams showing examples of a display message in a case where it is judged that data cannot be played back.
Figure 9:
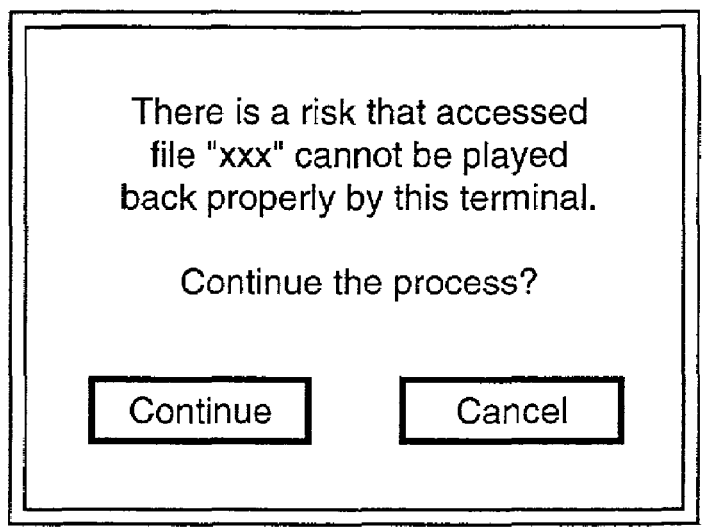

When it is judged that the playback of data is impossible, a message for explaining this state can be displayed on the display means 104. This is realized by, for example, also instructing the display means 104 that the playback is impossible when the stop of receiving the data is instructed in step 409 as shown in the flowchart of FIG. 4. An example of the message which is displayed on the display means 104 at that time is shown in FIG. 9(a). When the message for informing the user that the digital data which are being received cannot be played back is displayed as shown in FIG. 9(a), the ease of use of the data playback apparatus is increased.

In the data playback apparatus according to this embodiment of the present invention, when the flag is "0" in step 407 in the flowchart of FIG. 4, the receiving is instructed to be stopped in step 409. However, it is also possible to display a message as shown in FIG. 9(b), and leave it to the user's judgement as to whether or not the process is to be continued. In the example as shown in FIG. 9(b), the user can select either "Continue" or "Cancel". When the user selects "Cancel" here, the receiving is stopped. On the other hand, when the user selects "Continue", the receiving is continued, and the decoding and playback of data is tried.

In the data playback apparatus according to this embodiment of the present invention, assume that the data structure element for judging whether data can be played back by the data playback apparatus is the data structure element 2, and this data structure element is the second one (second data structure element 2012) in the first data part. However, the data structure can be the N-th one in the first data part (N is larger than "2" and equal to or smaller than the number of data structure elements included in the first data part). When the data structure is the second one in the first data part, the judgement as to whether or not the playback in the data playback apparatus is possible can be made quickly.

Figure 2:
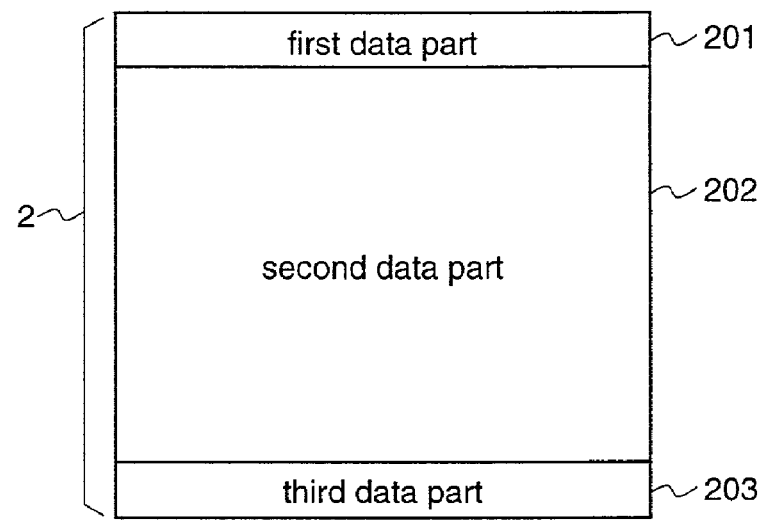
FIGS. 2(a)–2(c) are diagrams for explaining a structure of digital data which are received by the data playback apparatus according to the embodiment of the present invention.
Figure 2:
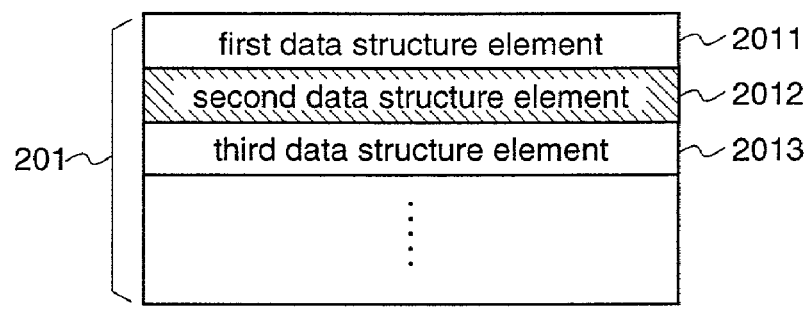
Figure 2:
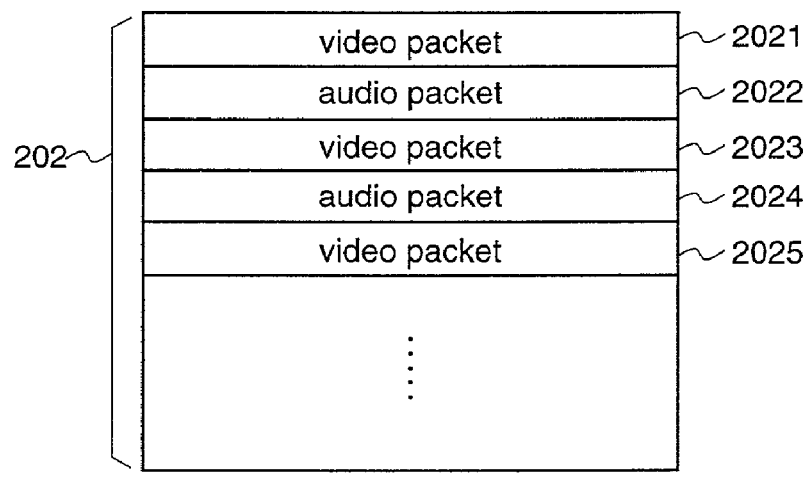
Figure 3:
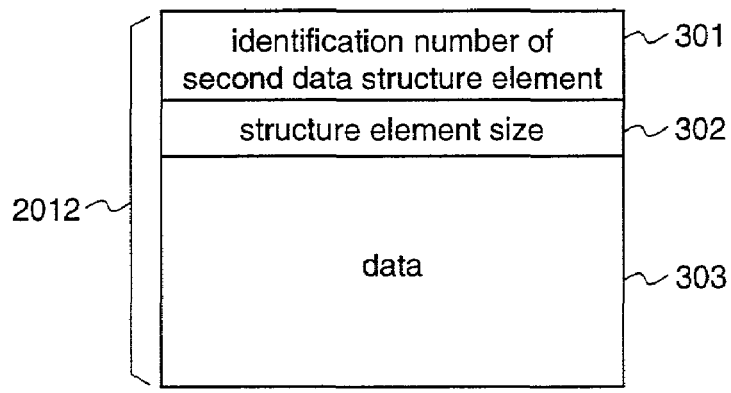
FIGS. 3(a)–3(c) are diagrams for explaining the structure of the digital data which are received by the data playback apparatus according to the embodiment of the present invention.
Figure 3:
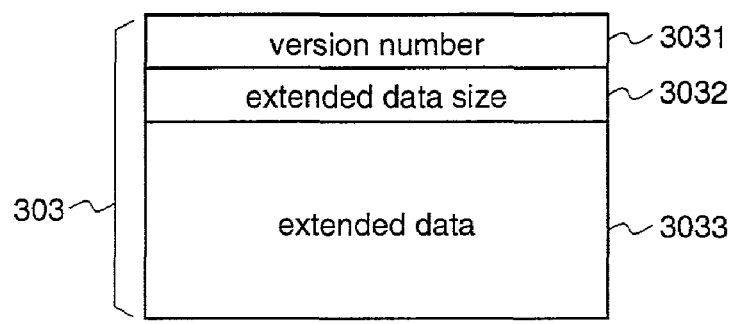
Figure 3:
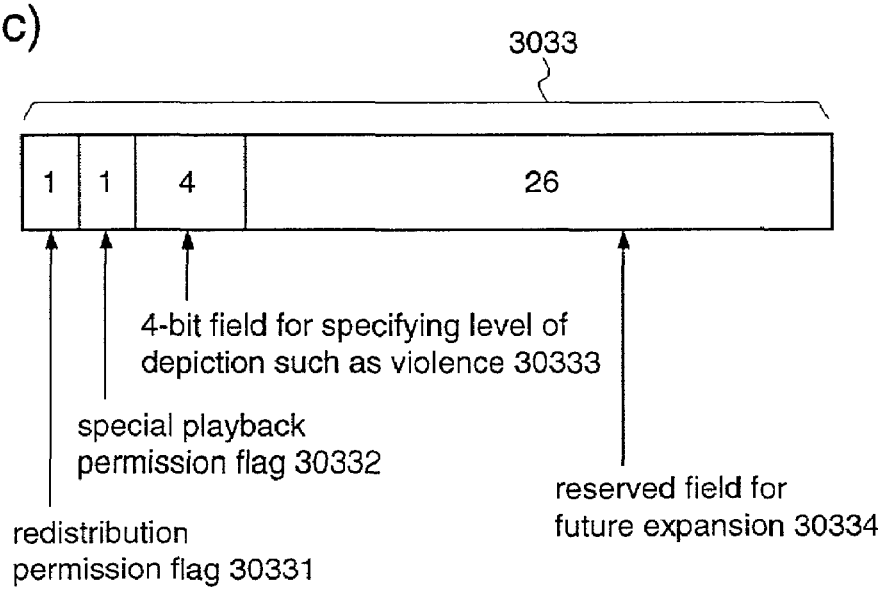
Figure 6:
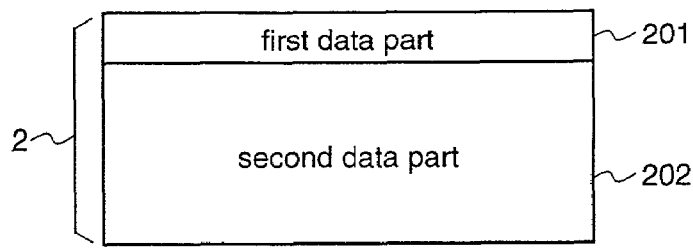
FIGS. 6(a) and 6(b) are diagrams for explaining another structure of the digital data which are received by the data playback apparatus according to the embodiment of the present invention.
Figure 6:
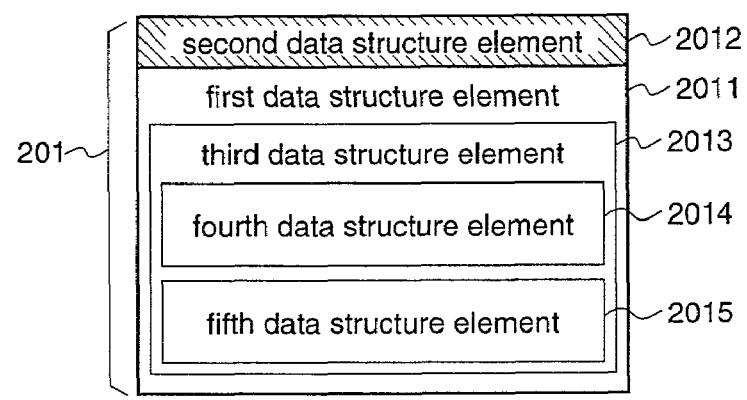

As shown in FIG. 6, it is also possible that the digital data 2 are composed of only the first data part 201 and the second data part 202, and the third data part 203 shown in FIG. 2(*a*) for the random access are not included.

In addition, as shown in FIG. 6(*b*), it is possible that the second data structure element 2012 is positioned at the head of the first data part 201 and this data structure element can be the so-called nested structure. For example, the first data structure element 2011 shown in FIG. 6(*b*) has a nested structure in which the third data structure element 2013 is included. The third data structure element 2013 has a nested structure in which the fourth and fifth data structure elements 2014 and 2015 are included.

Figure 7:
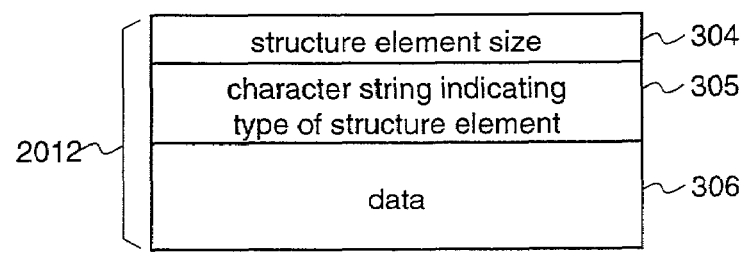
FIGS. 7(a) and 7(b) are diagrams for explaining another structure of the digital data which are received by the data playback apparatus according to the embodiment of the present invention.
Figure 7:
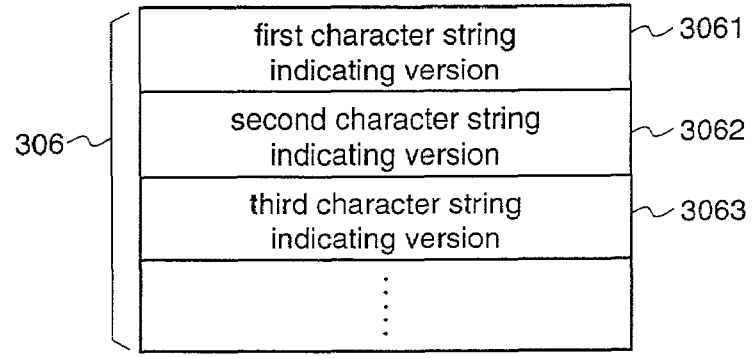

Further, as shown in FIG. 7(*a*), the second data structure element 2012 can be composed of a structure element size 304, a character string 305 indicating the type of the structure element, and data 306.

As shown in FIG. 7 (*b*), the contents of the data 306 in the second data structure element 2012 can be composed of a first character string 3061 indicating a version of the data 2, a second character string 3062 indicating a version of the data 2, a third character string 3063 indicating a version of the data 2, . . . .

Figure 8:
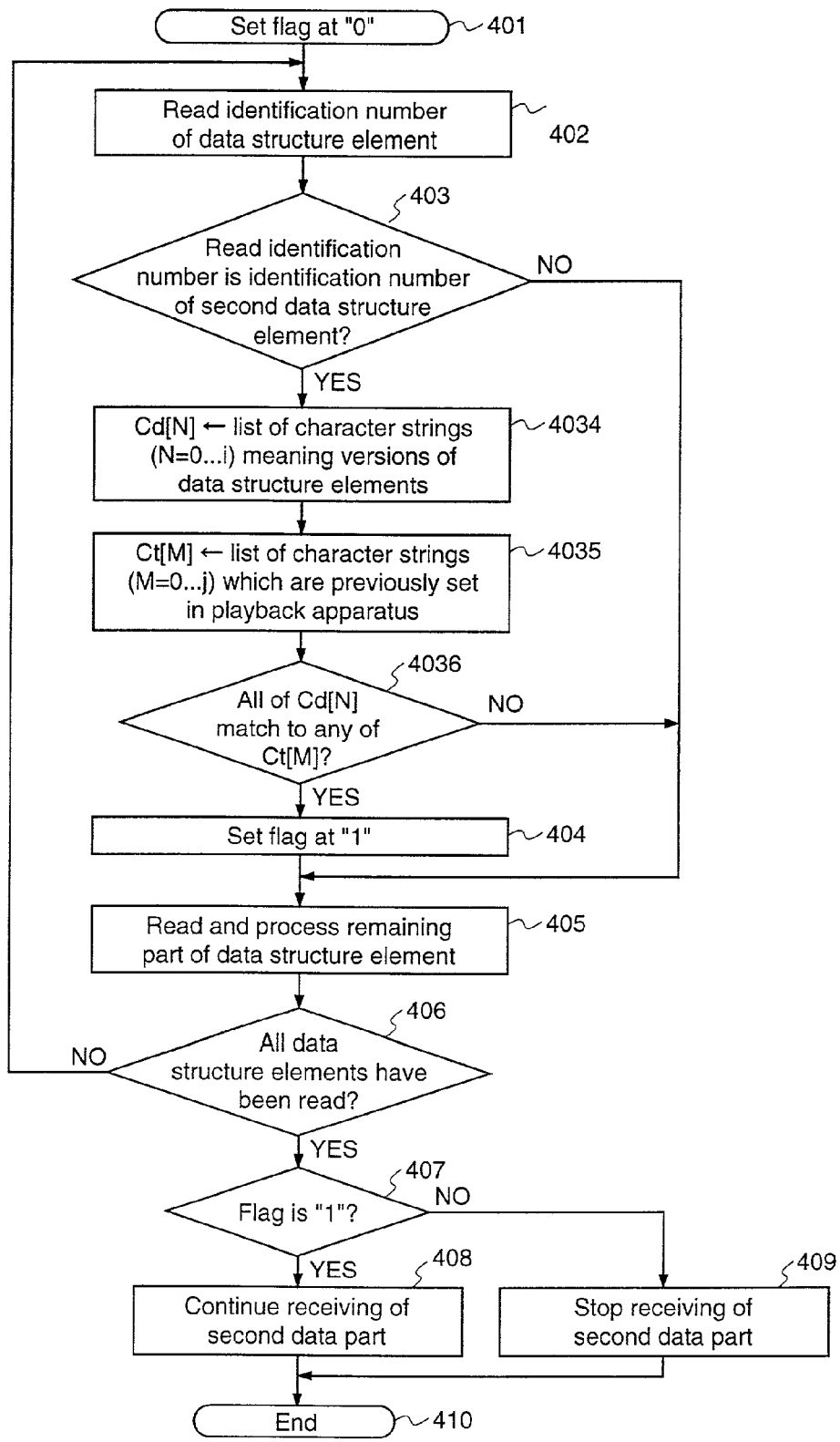
FIG. 8 is a flowchart for explaining another example of part of the operation of the analysis means of the data playback apparatus according to the embodiment of the present invention.

FIG. 8 is a flowchart for explaining the operation of the analysis means 105 when the digital data 2 have the structure as shown in FIG. 6, with attention being focused on the process for the second data structure element.

In step 401, the flag is set at "0". This flag is used for judging whether the second data structure element 2012 is in the first data part 201. In step 402, the identification number of the data structure element is read. In step 403, it is judged whether or not the read identification number matches the identification number of the second data structure element 2012, and the processes of steps 4034 to 4036 are carried out only when the identification numbers match.

In step 4034, a list of character strings which indicate the versions in the structure is read and assigned to an array Cd[N] (N=0, . . . , i). In step 4035, a list of character strings indicating the versions which are previously set in the data playback apparatus itself is input and assigned to an array Ct[M] (M=0, . . . , j). In step 4036, when all elements of the array Cd[N] match any of the elements of the array Ct[M], i.e., the version number of the data playback apparatus itself is equal to or larger than the version number in the structure element, and the operation proceeds to step 404. Otherwise, step 404 is skipped.

In step 404, the flag is set at "1". Then, in step 405, the remaining part of the data structure element is read and processed. The remaining part of the data structure element can be read by using a value indicated by the data size 304 as shown in FIG. 7(*a*). Then, in step 406, it is judged whether or not all data structure elements in the first data part 201 have been processed. when there are data structure elements left to be processed, the operation returns to step 402, and the processes of step 403 and thereafter are repeatedly performed. On the other hand, when the processes for the all data structure elements have been completed, the judgement of the flag is made in step 407. When the flag is set at "1", the receiving of the second data part 202 is continued (step 408). On the other hand, when the flag is set at "0", the receiving of the second data part 202 is stopped (step 409). As an example of methods for stopping the data receiving, a method for cutting the connection with the data server or the like can be used.

In the example as shown in FIG. 6, the second data structure element 2012, as a target of judgement as to whether the data are for the portable terminals, is positioned at the head of the first data part 201, i.e., the head of the file. Therefore, the analysis means 105 can judge whether or not the data 2 are data for the portable terminals most promptly after receipt of the data 2.

Further, in the example shown in FIG. 8, in the processes of steps 4034 to 4036 between steps 403 and 404, the character string indicating the version of the data structure element is compared with the character string indicating the version which is stored in the data playback apparatus. However, it is also possible to omit the processes of steps 4034 to 4036 as shown in FIG. 4, and always carry out the data playback when there is the second data structure element.

Further, as in the example of FIG. 4, it is also possible to refer to the extended data in the data 306 to perform the special playback or the like.

In the data playback apparatus according to this embodiment of the present invention, the operation of the receiving means 101 is controlled by using the version number in the data 303 of the data structure element 2012. However, it is also possible to control the operations of the receiving means 101, the decoding means 103, and the display means 104 according to the information included in the extended data 3033.

Further, in the data playback apparatus according to this embodiment, when the first data part of the received digital data is analyzed and it is consequently judged that the playback is impossible, the receiving of the digital data is instructed to be stopped. However, it is also possible that only the first data part is initially requested and received by the HTTP to be analyzed, and only when the playback is possible, the receiving of the remaining digital data is started by the HTTP. Even when not all of the first data part but only a part thereof are received, when the data structure element 2012 can be obtained, the same effects can be obtained. This can be realized by utilizing the function of receiving only part of data, which is prepared in the HTTP.

As described above, in the data playback apparatus according to this embodiment of the present invention, when digital data including audio and video data are to be received and played back, it is promptly judged whether or not the digital data can be played back by the data playback apparatus, and the receiving of the digital data is stopped when it is judged that the playback is impossible. Therefore, the communication charges involved in the data receiving can be reduced. That is, wasteful charges which are involved by continuing the download even though the data cannot be played back by this data playback apparatus can be avoided.

The data playback apparatus according to this invention can be used in a form of a portable terminal, hardware incorporated in a PC or the like, or a software program.

What is claimed is:

1. A data playback apparatus for playing back digital data having a first data part which includes attribute information of the digital data, and a second data part which is subsequent to the first data part and in which compressively coded audio and video data are multiplexed, while receiving the digital data, said data playback apparatus comprising:
   a receiver for receiving the digital data;
   a buffer for storing the received digital data;
   an analyzer for receiving the first data part in the stored digital data and analyzing the first data part;
   a decoder for receiving the second data part in the stored digital data and decoding the compressively coded audio and video data together with separating the data; and
   an output unit for outputting the audio and video data decoded by said decoder,
   wherein said analyzer is operable to detect a data structure element having a predefined value from the first data part, and instruct said receiver to stop receiving the digital data when the data structure element is not detected.

2. The data playback apparatus of claim 1, wherein when said analyzer does not detect the data structure element, said analyzer is operable to instruct said output unit to display a message which indicates that the digital data cannot be played back.

3. A data playback apparatus for playing back digital data having a first data part which includes attribute information of the digital data, and a second data part which is subsequent to the first data part and in which compressively coded audio and video data are multiplexed, while receiving the digital data, said data playback apparatus comprising:
   a receiver for receiving the digital data;
   a buffer for storing the received digital data;
   an analyzer for receiving the first data part in the stored digital data and analyzing the first data part;
   a decoder for receiving the second data part in the stored digital data and decoding the compressively coded audio and video data together with separating the data; and
   an output unit for outputting the audio and video data decoded by said decoder,
   wherein said analyzer is operable to compare a first version number of digital data which are included in a data structure element having a predefined value from the first data part with a second version number which is previously set in said data playback apparatus, and instruct said receiver to stop receiving the digital data when the first version number is larger than the second version number.

4. A data playback apparatus for playing back digital data having a first data part which includes attribute information of the digital data, and a second data part which is subsequent to the first data part and in which compressively coded audio and video data are multiplexed, while receiving the digital data, said data playback apparatus comprising:
   a receiver for receiving the digital data;
   a buffer for storing the received digital data;
   an analyzer for receiving the first data part in the stored digital data and analyzing the first data part;
   a decoder for receiving the second data part in the stored digital data and decoding the compressively coded audio and video data together with separating the data; and
   an output unit for outputting the audio and video data decoded by said decoder,
   wherein said analyzer is operable to compare a first version number of digital data which are included in a data structure element having a predefined value from the first data part with a second version number which is previously set in said data playback apparatus, and instruct said output unit to display a message which indicates that the digital data cannot be played back when the first version number is larger than the second version number.

5. A data playback apparatus for playing back digital data having a first data part which includes attribute information of the digital data, and a second data part which is subsequent to the first data part and in which compressively coded audio and video data are multiplexed, while receiving the digital data, said data playback apparatus comprising:
   a receiver for receiving the digital data;
   a buffer for storing the received digital data;
   an analyzer for receiving the first data part in the stored digital data and analyzing the first data part;
   a decoder for receiving the second data part in the stored digital data and decoding the compressively coded audio and video data together with separating the data; and
   an output unit for outputting the audio and video data decoded by said decoder,
   wherein said analyzer is operable to compare a first version number of digital data which are included in a data structure element having a predefined value from the first data part with a second version number which is previously set in said data playback apparatus and instruct said output unit to display inquire information which inquires a user of said data playback apparatus whether playback of the digital data is to be tried, when the first version number is larger than the second version number.

6. A data playback apparatus for playing back digital data having a first data part which includes attribute information of the digital data, and a second data part which is subsequent to the first data part and in which compressively coded audio and video data are multiplexed, while receiving the digital data, said data playback apparatus comprising:
   a receiver for receiving the digital data;
   a buffer for storing the received digital data;
   an analyzer for receiving the first data part in the stored digital data and analyzing the first data part;
   a decoder for receiving the second data part in the stored digital data and decoding the compressively coded audio and video data together with separating the data; and
   an output unit for outputting the audio and video data decoded by the decoder,
   wherein said analyzer is operable to detect a data structure element having a predefined value from the first data part, and change an operation mode of one of said receiver, said buffer, said decoder and said output unit, in accordance with information indicated by the data structure element.

7. A data playback method by which digital data having a first data part, which includes attribute information of the digital data, and a second data part, which is subsequent to the first data part and in which compressively coded audio and video data are multiplexed, are played back while being received, said method comprising:
 receiving the digital data;
 receiving the first data part in the received digital data and judging whether or not a data structure element having a predefined value is in the first data part;
 receiving the second data part in the received digital data and decoding the compressively coded audio and video data together with separating the data, only when the data structure element is judged to be in the first data part in said judging; and
 outputting the decoded audio or video data.

8. A storage medium containing a software program which makes a computer execute a data playback method by which digital data having a first data part, which includes attribute information of the digital data, and a second data part, which is subsequent to the first data part and in which compressively coded audio and video data are multiplexed, are played back while being received, said method comprising:
 receiving the digital data;
 receiving the first data part in the received digital data and judging whether or not a data structure element having a predefined value is in the first data part;
 receiving the second data part in the received digital data and decoding the compressively coded audio and video data with separating to demultiplex the data, only when the data structure element is judged to be in the first data part in said judging; and
 outputting the decoded audio or video data.

9. The data playback apparatus of claim 1, wherein the data structure element having the predefined value is positioned as a second data structure element in the first data part.

10. A data structure having:
 a first data part which includes attribute information of said data structure; and
 a second data part which is subsequent to said first data part and in which compressively coded audio and video data are multiplexed, wherein:
 the first data part includes playback suitability information which indicates to a data playback apparatus having restrictions on data playable targets under functional constraints that the data structure is suitable for playback by the data playback apparatus; and
 the data playback apparatus is operable to read the first data part, and judge whether or not the playback of audio data or video data included in the second data part is possible, according to whether or not the playback suitability information is included in said first data part.

11. The data structure of claim 10, wherein:
 the first data part is composed of first to N-th (N is an integer which is equal to 2 or larger) data structure elements; and
 a second data structure element among the first to N-th data structure elements indicates the playback suitability information.

12. The data structure of claim 11, wherein the second data structure element is positioned at a head of the first data part or in the vicinity of the head.

13. The data structure of claim 12, wherein the first to N-th data structure elements each have identification number information indicating one of the first to N-th data structure elements.

14. The data structure of claim 11, wherein the data structure element has version information indicating a version of a data structure which includes the data structure element.

15. The data structure of claim 11, wherein the data structure element has extended data indicating handling information which indicates various kinds of handling for the data structure.

* * * * *